July 19, 1949.  J. E. REILLY ET AL  2,476,911
EXCITATION LIMITING SYSTEM
Filed Jan. 9, 1947
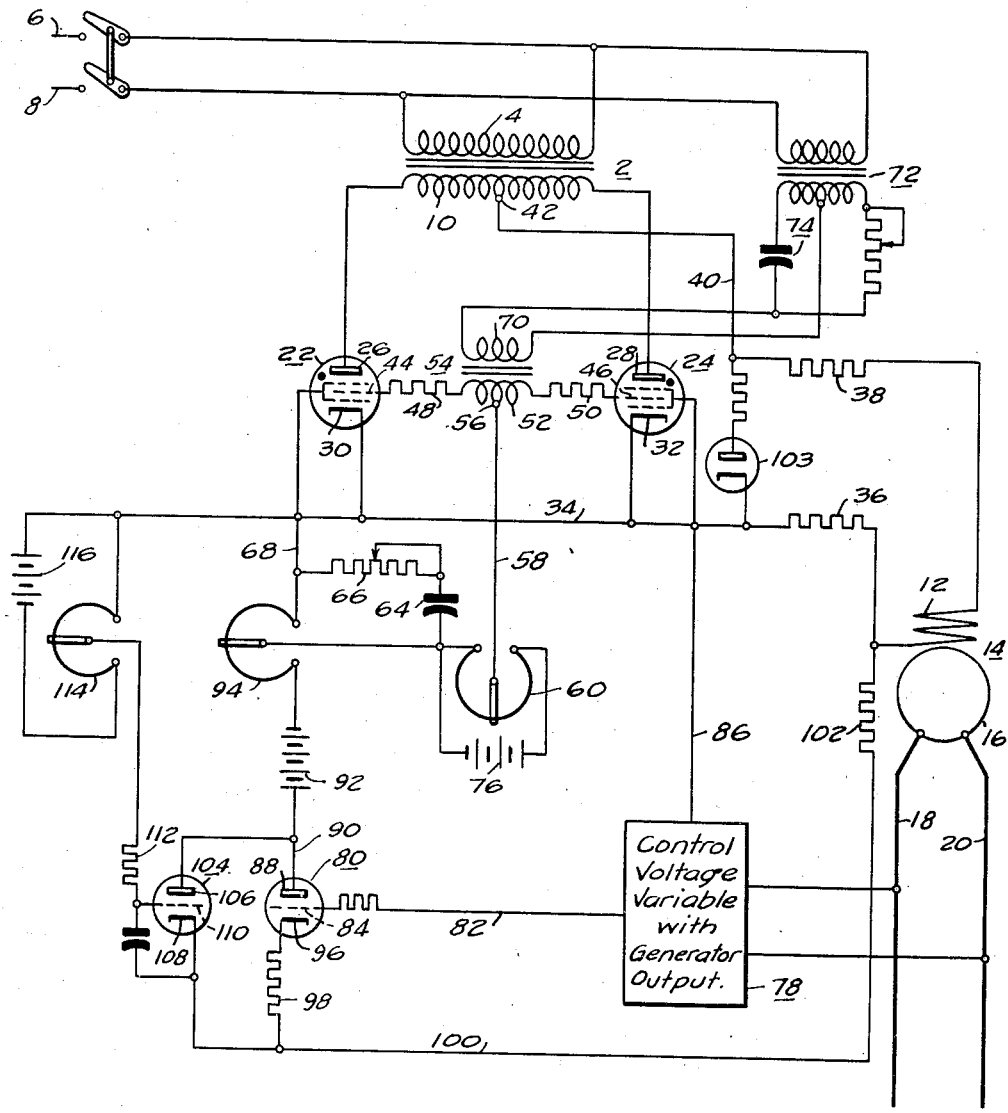
WITNESSES:
INVENTORS
Jack E. Reilly and
Robert M. Jolly.
BY
ATTORNEY Patented July 19, 1949

2,476,911

UNITED STATES PATENT OFFICE 2,476,911

EXCITATION LIMITING SYSTEM

Jack E. Reilly and Robert M. Jolly, Pittsburgh, Pa., assignors to Westinghouse Electric Corporation, East Pittsburgh, Pa., a corporation of Pennsylvania Application January 9, 1947, Serial No. 721,076

9 Claims. (Cl. 322—73)

This invention relates to electrical systems and in particular to electrical systems for controlling the excitation of a generator.

In controlling the excitation of high frequency inductor type generators, it is found that if the field current is increased beyond a predetermined value that the terminal voltage of the generator is decreased whereby the voltage regulator associated therewith fails to correct the excitation but instead tends to increase the excitation with the result that the terminal voltage is further reduced until the residual value is obtained.

An object of this invention is to provide for limiting the field current of a high frequency generator to a predetermined value.

Another object of this invention is to provide for limiting the excitation of a high frequency generator and thereby prevent operation of the regulator or control device associated therewith from operating to increase the excitation beyond a predetermined limit.

A further object of this invention is to provide for modifying the controlling action of a regulator to limit the excitation of a high frequency generator to a predetermined upper value.

Other objects of this invention will become apparent from the following description when taken in conjunction with the accompanying drawing, the single figure of which is a diagrammatic sketch of apparatus and circuits embodying the features of this invention.

Referring to the drawing, a main supply transformer 2 having a primary winding 4 is disposed to be energized from alternating-voltage supply lines 6 and 8. The secondary winding 10 of the transformer 2 is disposed and connected to supply current for energizing the field winding 12 of a generator 14, the armature 16 of which may be driven by a suitable prime mover (not shown) whereby a voltage across the output conductors 18 and 20 is obtained.

In this embodiment, a pair of electric discharge valves 22 and 24 of the arc-like type, preferably thyratrons, are interposed between the secondary winding 10 of the supply transformer 2 and the field winding 12 of the generator 14. The anodes 26 and 28 of the valves 22 and 24, respectively, are connected to opposite ends of the secondary winding 10. The cathodes 30 and 32 of the valves 22 and 24, respectively, are connected together and through a conductor 34 and a resistor 36 to one end of the field winding 12, the other end of which is connected through a resistor 38 and conductor 40 to an intermediate tap 42 on the secondary winding 10.

The control grids 44 and 46 of valves 22 and 24, respectively, are connected through individual grid resistors 48 and 50, respectively, to opposite ends of the secondary winding 52 of a grid transformer 54. The center tap 56 on the secondary winding 52 of the grid transformer 54 is connected through conductor 58, potentiometer resistor 60, capacitor 64, adjustable resistor 66 and conductors 68 and 34 to the cathodes 30 and 32 of the valves 22 and 24. The primary winding 70 of the grid transformer 54 is energized from the supply lines 6 and 8 through an auxiliary transformer 72 and a phase-shifting circuit 74. The phase-shifting circuit 74 is preferably adjusted so that the alternating voltage appearing across the secondary winding 52 of the grid transformer 54 between the control grid and cathode of each of the valves 22 and 24 is displaced in phase by approximately 90° with respect to the anode to cathode voltage.

As illustrated, a direct-current biasing voltage is impressed across the resistor 60 from a suitable source such as the battery 76. A direct-current voltage of opposite polarity is impressed across potentiometer resistor 94 dependent upon the output of the generator 14.

In this instance, the voltage across the output conductors 18 and 20 is measured by a suitable control device 78, the output of which is directly dependent or variable with the generator output. Many such devices are known and need not be illustrated but only represented schematically. The output of the control device 78 is utilized for controlling the conductivity of a vacuum tube 80. one of the output conductors 82 of the control device 78 being connected to the control grid 84 of tube 80, the other of the output conductors 86 being connected to the conductor 34.

The anode 88 of tube 80 is connected by conductor 90 through a source of direct-current voltage, such as the battery 92 and a potentiometer resistor 94 through conductor 68 to conductor 34, the cathode 96 of tube 80 being connected through resistor 98, conductor 100 and resistors 102 and 36 to conductor 34. Thus as the voltage across conductors 18 and 20 increases the control device 78 functions to impress a less negative voltage on the grid 84 of vacuum tube 80 to render the tube more conducting whereby a larger potential drop appears across potentiometer resistor 94. The potentiometer resistor 94 is connected in parallel circuit relation with capacitor 64 and resistor 66. Thus, a potential drop appears across potentiometer resistor 94 depending upon the conductivity of tube 80 and of opposite polarity to the direct-current potential across resistor 60 for controlling the grid to cathode potential of the valves 22 and 24.

Thus, the valves 22 and 24 are normally rendered alternately conductive in successive half-periods of opposite polarity of the alternating supply voltage with the firing point determined by the magnitude of the control voltage. Current then flows from the secondary winding 10 of the supply transformer 2 through the valves 22 and 24 alternately, conductor 34, resistor 36, field winding 12, resistor 38 and conductor 40 to the center tap 42 of the secondary winding. Thus, pulsating unidirectional current is supplied through the field winding 12 and the average magnitude of that current depends upon the firing points of the valves 22 and 24. As illustrated, a discharge valve 103 is connected across the field winding 12 to dissipate the stored energy therefrom during the portion of the half cycle in which valves 22 and 24 are not conducting to prevent feedback from the field to the valves.

In machines of the type illustrated, for example, high frequency inductor type generators, the generator 14 has a saturation characteristic such that if the current in the field winding 12 is increased beyond a certain value, the iron in the machine becomes saturated and the slotted rotor or armature 16 will not be able to give as great a flux change across the air gap after this point is passed by the field current. Under such conditions of operation, the terminal voltage as generated in the machine will become proportionately less as the field current is further increased. Thus, in a machine which is required to operate near the hump of the saturation curve, it is possible that the regulating equipment may force the field current beyond the point referred to with the result that the generator voltage is lowered and as the regulator attempts to correct for such lowered voltage, the field current is increased until the generator voltage is reduced to its residual value.

In order to prevent such adverse operation of the generator 14, a current limiting circuit is embodied in the system shown in the drawing, an electric discharge valve 104 being employed to control the circuit. The anode 106 of valve 104 is connected to conductor 99 with the cathode 108 being connected to the conductor 100 to control a circuit extending from the cathode 108 through conductor 100, resistors 102 and 36, conductors 34 and 68, potentiometer resistor 94, battery 92 and conductor 90 to the anode 106. The grid circuit of valve 104 extends from the grid 110 through resistor 112, potentiometer resistor 114 which is connected across a source of direct-current energy, such as the battery 116, conductor 34, resistors 36 and 102 and conductor 100 to the cathode 108 of valve 104.

In practice the potentiometer resistor 114 is adjusted so that the negative grid voltage supplied thereby will be sufficient to prevent the firing of valve 104 when the potential drop across resistor 36 is just below the value that is obtained when the desired field current which the valve 104 is to limit is passed through resistor 36. As the field current approaches the point referred to hereinbefore at which the iron of the generator becomes saturated the potential drop across resistor 36 is so increased as to render the grid bias of valve 104 less negative to cut the critical voltage of the valve and render it conducting.

As valve 104 is rendered conducting current flows through potentiometer resistor 94 and produces a negative grid potential thereacross which is in the grid circuits of valves 22 and 24. Thus, as valve 104 becomes conducting, the firing of valves 22 and 24 is phased back independent of the demands of the control device 78 and the valves are held at that point until the load on the generator 14 is reduced with a resulting decrease in the field current. Thus, the field current is controlled by the potentiometer resistor 94 of the parallel connected valves 80 and 104 which are independently controlled.

The valve 104 and its control circuit is very effective in limiting the flow of current in the field winding 12 of the generator 14 while permitting full field forcing action of valves 22 and 24 to be applied to the generator field windings 12 until the predetermined limit of field current is reached. The system is formed of standard elements, can be readily duplicated and is efficient in operation.

We claim as our invention:

1. In a system for controlling the excitation of a generator having a field winding, in combination, valve means of the arc-like type connected in circuit with the field winding and disposed to be operated to pass current therethrough, control means disposed to be operated in response to the generator output for normally controlling the conductivity of the valve means, an auxiliary valve means connected in circuit relation with the control means, and means responsive to a predetermined flow of current in the field winding disposed to render the auxiliary valve means conducting only when said predetermined flow of current is attained to modify the controlling action of the control means and retard the conductivity of the valve means.

2. In a system for controlling the excitation of a generator having a field winding, in combination, valve means of the arc-like type connected in circuit with the field winding and disposed to be operated to pass current therethrough, control means disposed to be operated in response to the generator output for normally controlling the conductivity of the valve means, an auxiliary valve means connected in circuit relation with the control means, a grid control circuit for the auxiliary valve means, and means in the grid control circuit for rendering the auxiliary valve means conducting only when the flow of current in the field winding reaches a predetermined value to thereby modify the controlling action of current is attained to modify the controlling of the valve means.

3. In a system for controlling the excitation of a generator having a field winding, in combination, valve means of the arc-like type connected in circuit with the field winding and disposed to be operated to pass current therethrough, a resistor connected in circuit between the valve means and the field winding to give a potential drop proportional to the current flowing in the field winding, control means disposed to be operated in response to the generator output for normally controlling the conductivity of the valve means, an auxiliary valve means connected in circuit relation with the control means, and a grid control circuit including said resistor for rendering the auxiliary valve means conducting only when the flow of current in the field winding reaches a predetermined value to thereby modify the controlling action of the control means and retard the conductivity of the valve means.

4. In a system for controlling the excitation of a generator having a field winding, in combination, valve means of the arc-like type connected in circuit with the field winding and disposed to be operated to pass current therethrough, a first resistor connected in circuit between the valve means and the field winding to give a potential drop proportional to the current flowing in the field winding, control means including a vacuum tube disposed to be operated in response to the generator output, a second resistor connected in circuit relation with the vacuum tube and the valve means and disposed to have a potential drop thereacross depending upon the conductivity of the vacuum tube for normally controlling the conductivity of the valve means, an auxiliary valve means connected in circuit relation with the vacuum tube and the second resistor, and a grid circuit including said first resistor for rendering the auxiliary valve means conducting only when the flow of current in the field winding reaches a predetermined value to so increase the potential drop across said second resistor as to retard the conductivity of the valve means.

5. In a system for controlling the excitation of a generator having a field winding, in combination, valve means of the arc-like type connected in circuit with the field winding and disposed to be operated to pass current therethrough, control means including a vacuum tube disposed to be operated in response to the generator output for normally controlling the conductivity of the valve means, an auxiliary valve means connected in circuit relation with the control means, and means responsive to a predetermined flow of current in the field winding disposed to render the auxiliary valve means conducting only when said predetermined flow of current is attained to thereby modify the controlling action of the control means and retard the conductivity of the valve means.

6. In a system for controlling the excitation of a generator having a field winding, in combination, valve means of the arc-like type connected in circuit with the field winding and disposed to be operated to pass current therethrough, a grid circuit having a positive biasing means for controlling the conductivity of the valve means, means for applying a negative biasing potential to said grid circuit, control means including a vacuum tube disposed to be operated in response to the generator output for normally controlling said negative biasing potential, an auxiliary valve means connected in circuit relation with said negative biasing potential means, and means responsive to a predetermined flow of current in the field winding disposed to render the auxiliary valve means conducting only when said predetermined flow of current is attained to thereby modify the controlling action of the control means on said negative biasing potential means to retard the conductivity of the valve means.

7. In a system for controlling the excitation of a generator having a field winding, in combination, valve means of the arc-like type connected in circuit with the field winding and disposed to be operated to pass current therethrough, a resistor connected in circuit between the valve means and the field winding to give a potential drop proportional to the current flowing in the field winding, a grid circuit having a positive biasing means for the valve means, means for applying a negative biasing potential to said grid circuit to cooperated with the positive biasing means for controlling the conductivity of the valve means, control means including a vacuum tube disposed to be operated in response to the generator output for normally controlling said negative biasing potential, an auxiliary valve means connected in circuit relation with said negative biasing means, and a grid control circuit including said resistor for rendering the auxiliary valve means conducing only when the flow of current in the field winding reaches a predetermined value to thereby modify the controlling action of the control means on said negative biasing potential means to retard the conductivity of the valve means.

8. In a system for controlling the excitation of a generator having a field winding, in combination, valve means of the arc-like type connected in circuit with the field winding and disposed to be operated to pass current therethrough, a resistor connected in circuit between the valve means and the field winding to give a potential drop proportional to the current flowing in the field winding, control means disposed to be operated in response to the generator output for normally controlling the conductivity of the valve means, an auxiliary valve means connected in circuit relation with the control means, and a grid control circuit for the auxiliary valve means, said grid control circuit including a source of negative grid potential and said resistor in series circuit relation whereby the resistor cooperates with said source of negative grid potential to render the auxiliary valve means conducting only after the flow of current in the field winding reaches a predetermined value to thereby modify the controlling action of the control means and retard the conductivity of the valve means.

9. In a system for controlling the excitation of a generator having a field winding, in combination, valve means of the arc-like type connected in circuit with the field winding and disposed to be operated to pass current therethrough, a first resistor connected in circuit between the valve means and the field winding to give a potential drop proportional to the current flowing in the field winding, control means including a vacuum tube disposed to be operated in response to the generator output, a second resistor connected in circuit relation with the vacuum tube and the valve means and disposed to have a potential drop thereacross depending upon the conductivity of the vacuum tube for normally controlling the conductivity of the valve means, an auxiliary valve means connected in circuit relation with the vacuum tube and the second resistor, and a grid control circuit for the auxiliary valve means, said grid control circuit including a source of negative grid potential and said first resistor in series circuit relation whereby said first resistor cooperates with said source of negative grid potential to render the auxiliary valve means conducting only after the flow of current in the field winding reaches a predetermined value to thereby increase the potential drop across said second resistor to retard the conductivity of the valve means.

JACK E. REILLY.
ROBERT M. JOLLY.

REFERENCES CITED

The following references are of record in the file of this patent:

UNITED STATES PATENTS

| Number | Name | Date |
| --- | --- | --- |
| 2,002,369 | Frohmer | May 21, 1935 |